GRANULAR COATED WEBS AND METHOD OF MAKING SAME

Original Filed Sept. 23, 1933 2 Sheets-Sheet 1

INVENTOR.
ROMIE L. MELTON
RAYMOND C. BENNER
HENRY P. KIRCHNER
BY R. C. Benner
ATTORNEY.

GRANULAR COATED WEBS AND METHOD OF MAKING SAME

Original Filed Sept. 23, 1933 2 Sheets-Sheet 2

INVENTOR.
ROMIE L. MELTON
RAYMOND C. BENNER
HENRY P. KIRCHNER
BY
R C Benner
ATTORNEY.

Reissued July 24, 1951 Re. 23,395

UNITED STATES PATENT OFFICE 23,395

GRANULAR COATED WEBS AND METHOD OF MAKING SAME

Romie L. Melton, Raymond C. Benner, and Henry P. Kirchner, Niagara Falls, N. Y., assignors, by mesne assignments, to The Carborundum Company, Niagara Falls, N. Y., a corporation of Delaware Original No. 2,201,194, dated May 21, 1940, Serial No. 690,698, September 23, 1933. Application for reissue August 13, 1945, Serial No. 610,479½

18 Claims. (Cl. 51—301)

Matter enclosed in heavy brackets [ ] appears in the original patent but forms no part of this reissue specification; matter printed in italics indicates the additions made by reissue.

This invention relates to the manufacture of granular coated webs of such material as paper, cloth and the like. The invention relates more particularly to the application of the sizing coat of adhesive to abrasive coated webs of the so-called oriented type in which the elongated abrasive particles are oriented at an angle, preferably approximately at right angles, to the surface of the web.

This application is a continuation in part of our co-pending application, Serial No. 647,242, filed December 14, 1932.

In the usual process by which abrasive coated materials have been made for many years, the abrasive particles were dropped onto a web of paper or cloth, as the case might be, upon which there was a surface coating of a suitable adhesive. The operation of coating the web with granular abrasive material was carried out with the adhesive side of the web facing upward in order that the grain be sprinkled or spread upon the web and deposited by gravitational attraction. The excess grain was then removed and after the adhesive had set, a second or sizing coating of adhesive was applied over the granular coating in order to more firmly secure the grains to the web. This sizing coat of adhesive was applied by means of a roll partially immersed and revolving in a pan of adhesive and contacting with the abrasive coated surface of the web.

In this old process the abrasive grain was allowed to fall haphazardly upon the upper adhesive coated surface of the web. Due to the action of gravity the elongated particles of abrasive grain for the most part were turned over and laid substantially flat against the surface and were, therefore, in a position which afforded a minimum cutting or abrading action when the abrasive paper or cloth was used.

There has been more recently developed abrasive paper and cloth commonly known as oriented abrasive paper and cloth in which elongated granules of the abrasive grain have been oriented with respect to the surface of the web of paper or cloth, so as to be upstanding therefrom and therefore in a position to afford a maximum cutting or abrading action.

Most of the abrasive grain such as crushed silicon carbide, crushed fused aluminum oxide, etc., consists of a conglomeration of particles of irregular shape. Some of the particles are blocky, but a considerable portion of the particles are of elongated form. In the making of oriented abrasive coated webs the grain is applied to the web so that such elongated particles are oriented with one end of the particle secured by the adhesive to the web, leaving the other end of the particle upstanding, preferably at approximately a right angle.

Such oriented paper or cloth has presented a problem in the application of the sizing coat of adhesive. The surface of the oriented abrasive coated web consists of sharp upstanding peaks between which are deep, narrow valleys.

The oriented elongated grains have only a limited anchorage in the base of the adhesive coat at one end and can, therefore, be knocked over easily during application of the size coat.

It has been found that if the sizing coat of adhesive is applied to an abrasive coated web by the usual size applying roller, the greater part of the oriented elongated particles are laid flat by the roller, and the cutting and abrading qualities of the coated web seriously impaired. Moreover, even if the size applying roller did not knock over the upstanding oriented particles, it would tend to apply the sizing coat of adhesive across the tops of the particles and not into the relatively deep, narrow valleys or crevices between the upstanding particles.

We have solved the problem of the application of the sizing layer of adhesive which is peculiar to the manufacture of oriented abrasive paper and cloth by applying the sizing coat as a spray which consists of minute droplets of the sizing adhesive, such as glue, which are driven down into the deep crevices or valleys between the upstanding oriented particles to form an additional support around the bases of such particles to maintain them in oriented position when the abrasive paper or cloth is used. Such a pressure spray tends to drive the sizing adhesive from the tops or the peaks of the grains and deposit it in the valleys, leaving the projecting points substantially uncoated, and with a maximum of cutting efficiency.

It has been found that if an attempt be made to apply the size coating by means of a spray to the oriented coated abrasive web prior to the setting of the base coat, a current of air or other vehicular medium which is required for forcing the droplets into the deep valleys between the upstanding particles will knock the upstanding particles flat. We have, therefore, found it to be desirable, if not necessary, to cause the base adhesive coating to become set before the application of the sizing coat spray.

In the manufacture of the usual abrasive coated paper and cloth, an animal glue, commonly known as hide glue, is the usual adhesive employed. No particular difficulty has been encountered in using hide glue in the process by which abrasive coated materials have been manufactured in the past, since such glue can be readily applied with the usual glue roll, both for the base coating and the sizing coating. However, hide glue is particularly non-amenable to the usual spraying processes and we have found that special procedure must be followed in using hide glue in the manufacture of oriented abrasive paper and cloth according to our processes.

If hide glue were to be applied to the oriented abrasive web to form the size coat by the usual spraying methods, the hide glue would become congealed before or at the instant of contact with the abrasive grains and would be deposited in a stringy condition upon the tops of the grains. Our tests in attempting to apply hide glue by the usual sprays have shown that a useful size coating can not be secured, but that the hide glue is deposited as a stringy top layer stretching across the peaks of the grains and not driven into the valleys.

This difficulty encountered with the spraying of hide glue is due to the fact that if the temperature of the hide glue drops much below 140° F., or if there is any substantial evaporation of moisture from the hide glue, the glue will immediately set into a stiff jell.

We have found that hide glue, which is the universal adhesive used in making the ordinary abrasive paper and cloth, can be successively applied by the spray process by surrounding the droplets of the glue solution with a vehicle which will prevent evaporation of moisture and maintain the droplets in a heated condition. Such a vehicle for the application of the spray may be steam or warm air substantially saturated with moisture. Such a vehicle, when driven against the abrasive coated surface in a steady stream, will carry the minute droplets of the glue solution down into the narrow valleys between the upstanding particles and deposit them at the bases of the particles before the glue has an opportunity to jell.

In the accompanying drawings, which illustrate the preferred embodiment of our invention:

Figure 1:
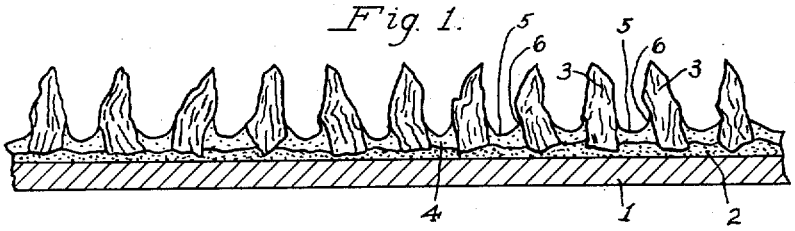
Figure 1 is an enlarged section through a fragment of the abrasive coated web embodying our invention.
Figure 2:
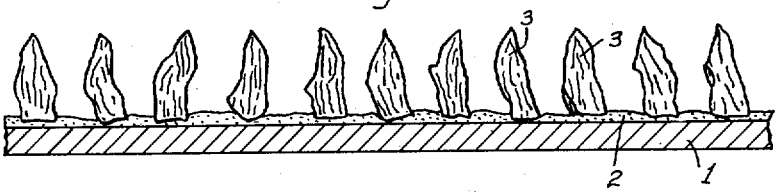
Figure 2 is a similar section showing the abrasive coated web at one stage of its manufacture.

Referring to Figure 1, which illustrates a fragment of an oriented abrasive web made in accordance with our invention, the reference numeral 1 indicates the web or backing which may be of any of the usual flexible materials such as paper or cloth. Applied to one face of the web is a base coating 2 of adhesive such as glue, which is applied prior to the application of the abrasive grain. The particles of the abrasive grain are indicated at 3, only elongated particles being shown for the purpose of better illustration. The size coating is indicated at 4, such size coating being obtainable by applying the size coating by the spray method using suitable precautions. As is shown in Figure 1, the upstanding oriented character of the elongated abrasive grains 3 is preserved. The size coating is, as shown in Figure 1, deposited chiefly at the bottoms of the crevices or valleys between the upstanding peaks. The tops of the upstanding peaks are left relatively free of the size coating. The size coating, which is applied and built up around the bases of the elongated particles, serves as additional support to hold such particles in their upstanding position during the use of the abrasive paper or cloth. As shown in Figure 2, the faces of the bottoms of the elongated particles contact with the base adhesive coating 2, giving a limited and insufficient supporting contact to maintain the elongated particles against lateral pressure and grinding stresses when the abrasive web is used. However, the size coating serves as an additional layer which extends up from the bottoms of the elongated particles, surrounding the bases of the elongated particles, and firmly holding them in their position in the completed abrasive paper or cloth.

As the spray is applied with a steam or gaseous vehicle such as steam or air under considerable velocity, the minute droplets of glue are not only forced into the narrow crevices at the bottoms of the sharp valleys, but the sizing coating as applied in such valleys is given the form indicated by reference numerals 5 and 6. The force of the spray tends to cause a depression in the middle of the glue film extending between the abrasive particles, such depression being indicated at 5, and to force the glue up along the sides of the abrasive particles indicated at 6. This gives a maximum support for the elongated particles with a minimum quantity of sizing adhesive, which contributes not only to the wearing properties of the abrasive paper or cloth, but to its free cutting qualities, since it permits maximum clearance between the upstanding particles for the reception of the abraded material. "Loading" is less pronounced in abrasive webs which have the size coating thus applied.

The preferred procedure in making abrasive coated webs in accordance with our invention will now be described. The web material 1 which may be, for example, paper or cloth, is supplied from a roll 11 and is carried over idler rolls 12, 13 and 14 to a glue roll 16 which dips into a glue pan 17 for the purpose of applying the base glue coating indicated at 2 in Fig. 1. The glue roll 16 is provided with the usual pressure roll 18. The adhesive coated web 1 is then passed over idler rolls 19 and 20, which contact with its uncoated face, to apparatus generally indicated by reference character A for applying the oriented abrasive coating. The coated web 1 is carried in a horizontal position with its adhesive coated surface facing downwardly over a device which projects the abrasive grain upward in such a manner that the grain is oriented and strikes the adhesive coated surface in an upstanding position. The device illustrated is of the belt and beater type and consists of a feed belt 21 and a number of co-acting beaters 22. The feed belt 21 travels continuously over driving rolls 23 in the direction indicated by arrows. Abrasive grain is fed in regulated amount to the belt from the grain hopper 24 which is provided with an adjustable feed gate 25 and cooperating feed roll 26. The grain is carried along by the belt over the beaters 22 which consist of rotary shafts having extending fins 27 which contact with the bottom of the belt. The effect of the beaters is to strike sharp blows against the bottom of the belt and project the abrasive grains upwardly from the belt against the downwardly facing adhesive coated surface of the web 1. During their flight from the belt upwardly to the adhesive coated web, the elongated abrasive particles become oriented and for the most part, strike the adhesive coated surface head on, somewhat like arrows.

A supplemental supporting roller 28 is provided for limiting the vibrating portion of the belt to that below the web. Any excess grain which does not adhere to the adhesive coated surface of the web is discharged into a box 29 for reuse.

The condition of the web as it passes to the left after the adhesive is applied is illustrated in Figure 2 in which reference numeral 1 indicates the web, 3 the abrasive particles, and 2 the base adhesive coat. As shown in Figure 2, the particles are rather insecurely held by the base adhesive coating. The force with which the particles are protected against the web, while sufficient to slightly embed the particles, leaves them supported for the most part by the rather limited contact area of the ends of the particles. As the web 1 passes from above the feed belt 21, the abrasive particles hang downwardly under the force of gravity somewhat like pendulums with their heads stuck on the wet sticky adhesive coated surface. In this condition the particles are rather sensitive to any influences which would tend to lay them flat against the web, and the travel of the web is therefore preferably continued in a horizontal direction until the adhesive coating has set, at least initially. The break 30 is indicated in the web to show a number of feet of travel, say twenty to thirty feet, of the web in a horizontal direction after the abrasive particles are applied to its under side. If desired, some device such as a fan 31 applying dry heated air against the bottom of the web may be employed to hasten the preliminary setting of the adhesive.

The illustrated form of device for applying the grain in an oriented condition to the web is that described and claimed in our co-pending application, Serial No. 647,244, filed December 14, 1932.

Further specific forms of devices for orienting the grain on an adhesive coated web may be employed, such as for example, as the apparatus shown in our co-pending application, Serial No. 636,982, filed October 10, 1932, in which abrasive grains are electrostatically oriented and applied upon a downwardly facing adhesive coated web. Another form of device which may be employed is that described in our co-pending application, Serial No. 637,016, in which is shown a device in which a magnetic field is employed to secure orientation of magnetically susceptible abrasive grain to insure the upstanding of the elongated particles from the web.

Any suitable device may be used for applying the abrasive grain, so long as such device secures orientation of a considerable part, preferably the greater part, of the elongated particles of the abrasive grain, although I prefer to employ a device in which the abrasive grain is projected upwardly against a downwardly facing web coated with an adhesive in a moist sticky condition. While this secures maximum orientation of the elongated grain, it leaves the elongated particles with their ends but slightly embedded and rather weakly supported by the base coat. The web with the grain thus applied is particularly adaptable for the second step in my process since it leaves valleys between the elongated grains of substantially the entire length of the grain, the bottoms of which valleys can be covered with the sizing adhesive and the film of glue extended up along the sides of the valleys, giving maximum support for the grains and at the same time, relatively large clearance space between the grains.

After the base coat 2 has set sufficiently so that the force of gravity will not destroy the orientation of the grain, the web is carried upwardly over idler rolls 32 to a suction drum 33 which serves to pull the paper through the glue applying roll and the device for applying the abrasive. From the suction drum 33, the web passes over the rolls 34 and 35 to drying racks 36 where it is festooned and hung on the bars 37. While the coated web is on the drying rack the base coat is preferably thoroughly set so as to give as much support as possible for the abrasive grain during the size coat applying operation. The web 1 is then subjected to the second step of the process which is the application of the sizing coat by means of suitable spraying apparatus. As shown in the drawings, a suction drum 39 removes the web from the drying rack 36 and passes said web underneath a plurality of spray nozzles 40 which spray a sizing coat of adhesive onto the upper surface of the abrasive coated web. We have found that if the base coating 2 is completely or substantially set, it will furnish sufficient support to enable the grains to maintain their upright oriented position against the upsetting force of the sprays which are applied with considerable force since one of the functions of the sprays is to force minute droplets into the very bottoms of the crevices between the upstanding grains. We have found, however, unless the base coating of adhesive is allowed to set, the force of the sprays will lay the elongated particles flat; hence, such provision for drying the base coat before spraying the second or sizing coating of adhesive.

We have found that while the base coat as thus set is sufficient to maintain the elongated particles upright against the spray, it is insufficient to maintain the particles in their oriented upright position against the contact with a glue roll, which is the device which has been practically universally employed heretofore in applying size coatings to abrasive coated paper and cloth.

We have found that if ordinary abrasive paper is made by applying a base adhesive coating to said paper, distributing abrasive particles over the base coating in the usual manner, then allowing the base coat to become set and thereafter spraying on the sizing coating of adhesive, the sharpness and cutting action of the abrasive paper is materially increased; since the setting of the base adhesive coating is sufficient to hold the random upstanding particles against the force of the spray although it would not hold them against the flattening action of a size applying roll.

As above explained, with particular reference to Figure 1, the spray nozzles break up the adhesive into minute droplets and drive such droplets with considerable velocity and force to the very bottoms of the narrow interstices or crevices between the upstanding oriented abrasive particles, and result in building up around the bases of such particles a supporting layer of adhesive which is relatively thin in the middle of the space between the particles, but which extends upwardly where it contacts with the particles, thereby giving maximum support with maximum clearance space, while leaving the upper parts or projecting peaks substantially free of adhesive.

We prefer to employ a number of spray nozzles 40. These are preferably arranged in several rows extending across the web and so spaced as to apply a uniform layer of adhesive. In sizing abrasive paper or cloth the amount of sizing adhesive is dependent upon the grit size and may vary from less than a pound for a ream of paper for small grit size to twenty pounds or more for a ream of paper of coarser grit size. By providing several rows of spray nozzles, the sizing coat may be applied by one or two or more rows of nozzles, depending upon the weight of the sizing coating required.

Figure 4:
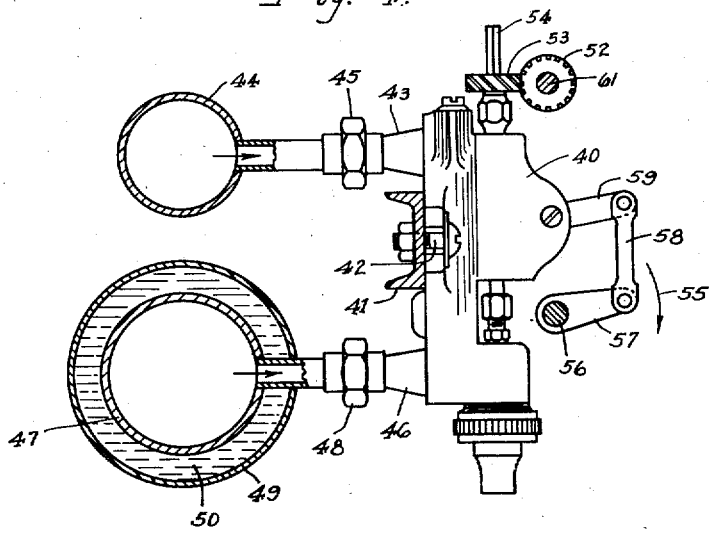
Figure 4 is a detailed view showing one form of spray nozzle which may be employed.
Figure 3:
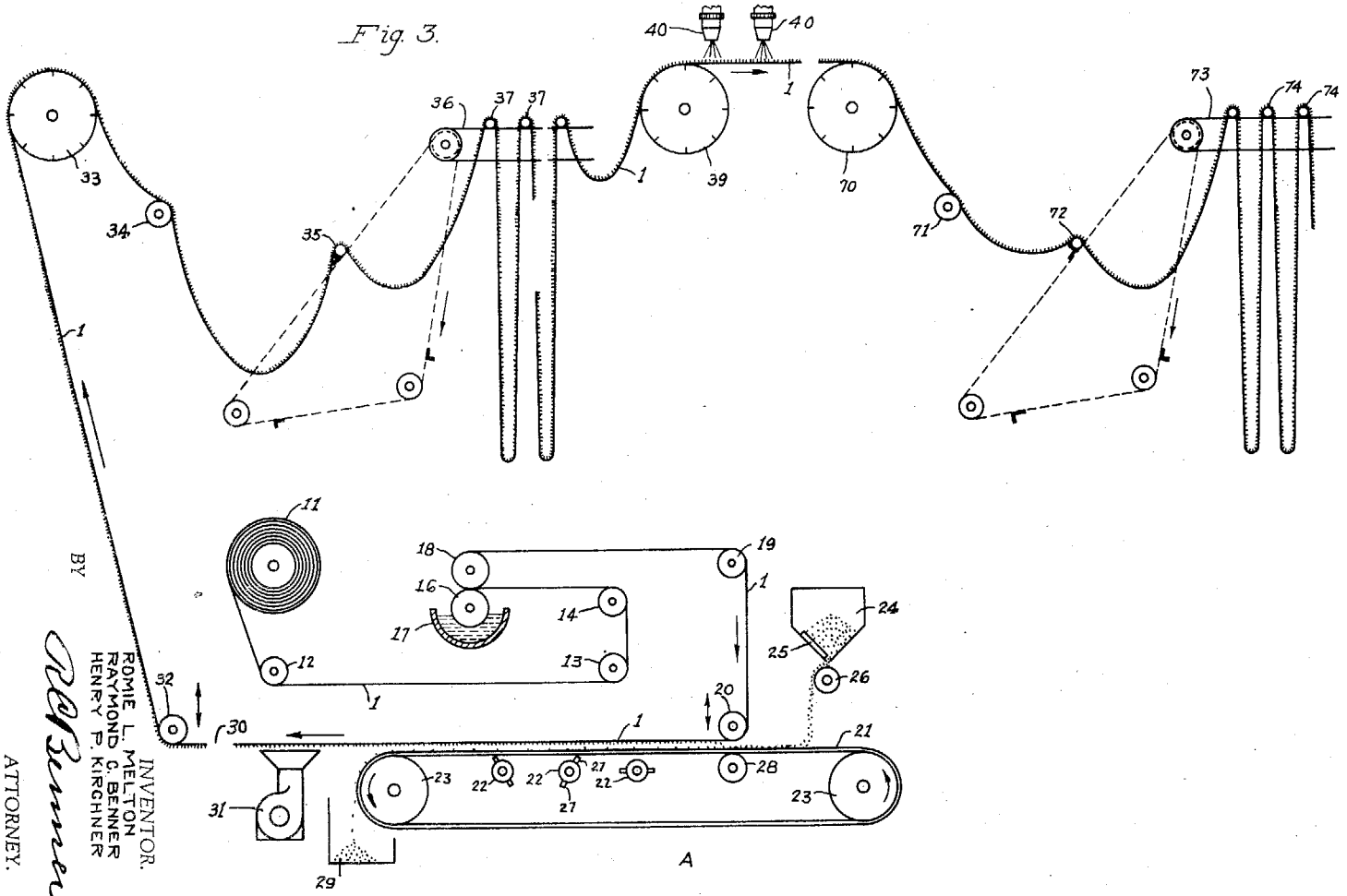
Figure 3 is a diagrammatic elevation of apparatus for manufacturing abrasive coated webs in accordance with our invention.

In Figure 4 there is illustrated a suitable form of spraying device which may be used in spraying adhesive coatings. The spray nozzle, generally indicated by the reference numeral 40, is shown mounted on a suitable framework or cradle. This cradle is shown in section, and includes the supply feed lines to the spray nozzles as well as the fluid control means. The spray nozzle 40, is attached to a supporting frame member 41, by means of the bolt and nut 42. From the atomizing pressure inlet 43, a connection is made to the steam duct 44, by means of the union connection 45. The fluid or adhesive inlet 46, is likewise connected to the adhesive supply tube 47, by means of the union 48. Surrounding the adhesive supply tube 47, is a shell or jacket 49 which provides a space 50, for water or any other fluid which is heated to approximately 145° F. By this arrangement, the adhesive flowing through the pipe 47, is maintained at the proper temperature and chilling or congealing prevented. The spray nozzle 40, is likewise water-jacketed and maintained at a temperature of approximately 145° F.

An entire row of six or more spray nozzles is controlled from the shaft 56, through arms 57, linkages 58, and triggers 59. This mechanism operates a valve within each spraying device and starts or stops the spray of adhesive. As an example, the adhesive spray is started by rotating the shaft 56, in a clockwise direction, as indicated by the arrow 55. The shaft 56, may be operated manually or by means of an electromagnetic device, not shown, but mounted at one end of the supporting framework. Electromagnetic operation is preferred since it provides remote control and can be connected with a centralized control of the entire abrasive making machine.

The quantity of adhesive sprayed by a row of spray nozzles is regulated by means of the shaft 61. The shaft 61, carries a spiral gear 52, which co-acts with another spiral gear 53, to vary the position of the adjustable stop 54. By this adjustment the extent of the opening of the internal fluid valve is controlled and the quantity of adhesive sprayed is increased or decreased. Rotation of the shaft 61, may be manual, or it may be produced by suitable means from a remote point.

Even though the spray nozzles can be manually controlled, it is desirable to have them synchronized with, and automatically controlled by the operation of the machine, in order that they will deliver adhesive at the rate required by the speed at which the web is moving through the machine. Thus, it is desirable to have the spray of adhesive start when the machine starts, increase in volume as the machine increases in speed (or decreases when the machine slows down), and stop when the machine stops. Automatic spray nozzles can be obtained in the open market and adapted to this work.

The provision of spraying nozzles and particularly the rows of spraying nozzles for applying the size coating effects certain economies in the handling of the glue. When glue is applied by the usual glue roll, a different viscosity glue is required for each weight of sizing coat applied, since the amount taken up by the glue roll is dependent upon the viscosity of the glue in the glue pan. This requires a change in the viscosity of the glue for changes in the grit size of the abrasive. In using spray nozzles, the glue can be standardized at one viscosity and the weight of the sizing coating can be varied for the different grit sizes by varying the feed to the spray nozzles and the number of rows of spray nozzles employed.

In employing the usual glue used for making abrasive paper and cloth, namely animal or hide glue, the glue solution is sprayed on with either steam or moisture saturated air as the spraying vehicle. We have employed steam taken from the end of a factory steam line. The pressure on the steam line was about one hundred and thirty pounds. Due to condensation of the line, the steam was somewhat over-saturated, carrying some excess water. The temperature of the steam discharge from the nozzle was about 150° F., which was sufficient to keep the glue from jelling, but not high enough to burn the glue. The steam pressure employed depends upon the type of spray nozzle and the viscosity of the glue. The steam is preferably fully saturated steam in order to prevent any evaporation of moisture from the glue droplets with consequent jelling. The steam jets for the spray nozzles also keep the glue droplets warm and prevent their jelling or chilling until they are deposited in place on the abrasive coated web.

While we prefer to use steam as the propelling vehicle for the spray, warm air which is saturated with moisture may be employed.

Since the animal or hide glue is the usual adhesive employed, we have shown and described the spray arrangement for using this usual adhesive. However, in making special grades of abrasive paper and cloth such as waterproof paper and cloth, other adhesives may be employed such as gum solutions or varnishes, which can be handled by suitable spray nozzles which may not require the use of steam or humidified air. It is preferred in handling such adhesives to employ a gaseous vehicle saturated with the solvent used for the adhesive, in order to insure against premature setting of the adhesive and insure the deposit of the sizing adhesive into suitably shaped films between and around the bases of the oriented abrasive particles.

While the provision of employing a saturated vehicle, such as steam or moisture saturated air, was developed primarily for applying the usual animal or hide glue in the making of oriented abrasive cloth or paper, such spraying procedure may have utility in the application of hide glue or similar adhesive sizings to other types of abrasive papers and cloths.

The abrasive web 1, after the application of the sizing coat, passes over the suction feed roller 70 and idler rolls 71 and 72 to a drying rack 73 where the web is hung on the usual bars 74 in a drying chamber to fully dry the size coating. The abrasive paper and cloth is then ready to be cut up and sold.

While we have specifically illustrated and described the preferred embodiment of our invention, it is to be understood that the invention may be otherwise embodied and practiced within the scope of the following claims.

We claim:

1. The process of making abrasive coated flexible webs which comprises applying a base coat of wet animal glue to a flexible web, applying a layer of abrasive grain to said wet base coat, spraying a sizing coat of liquid animal glue onto the abrasive coated web by means of a humid gaseous vehicle containing sufficient moisture to prevent drying the glue as it is sprayed, and thereafter drying the sizing coat.

2. The process of making abrasive coated flexible webs, which comprises applying a base coat of wet adhesive to a flexible web, applying a layer of abrasive grain over said base coat, and spraying a sizing coating of liquid adhesive onto the abrasive coated web by means of a gaseous vehicle containing a solvent of said adhesive.

3. The process of making abrasive coated flexible webs which comprises applying a base coating of wet adhesive to a flexible web, applying a layer of abrasive grain over said base coating, and spraying a sizing coating of liquid animal glue onto the layer of abrasive grain using steam as the atomizing agent for said glue.

4. The process of making abrasive coated flexible webs which comprises applying a base coat of wet adhesive to a flexible web, applying a layer of abrasive grain over said wet base coat, spraying onto the layer of abrasive grains a sizing coat of liquid adhesive of the character which when sprayed tends to set by evaporation of a solvent and sprayed by means of a gaseous vehicle containing a solvent of said adhesive.

5. The process of making abrasive coated flexible webs which comprises applying a base coat of wet adhesive to a flexible web, applying a layer of abrasive grain over said wet base coat, spraying onto the layer of abrasive grains a heated liquid adhesive of the character which when sprayed tends to set upon cooling and sprayed by means of a vehicle heated sufficiently to prevent setting of the adhesive during the said spraying operation.

6. The process of making abrasive coated flexible webs which comprises applying a base coat of wet adhesive to a flexible web, applying a layer of abrasive grain over said wet base coat, spraying onto the layer of abrasive grains a sizing coat of liquid adhesive of the character which when sprayed tends to stiffen upon evaporation of a solvent and cooling and sprayed by means of a heated gaseous vehicle containing a solvent of said adhesive.

7. The process of making abrasive coated flexible webs which comprises applying a base coat of wet adhesive to a flexible web, applying a layer of abrasive grain over said wet base coat, and spraying a sizing coat of liquid adhesive onto the layer of abrasive grain by means of a gaseous vehicle saturated with a solvent of said adhesive.

8. The process of making abrasive coated flexible webs which comprises applying a base coat of wet adhesive to a flexible web, applying a layer of abrasive grain over said base coat, and spraying a sizing coating of heated liquid animal glue onto the layer of abrasive grains by means of steam, the temperature of which is sufficient to maintain the glue in a heated state until deposition without overheating said glue.

9. The process of manufacturing coated abrasives comprising depositing abrasive particles on an adhesively coated backing sheet in oriented position and adhering the particles to the sheet, and applying an adhesive sizing solution thereto under conditions to avoid substantial softening of the adhesive whereby displacing of the abrasive particles from their original oriented position is prevented.

10. In the manufacture of coated abrasives having the particles in oriented position, the method of sizing the abrasive adhered upon a backing sheet comprising the steps of spraying adhesive sizing in solution form thereon in fractional increments proportioned in amount to avoid displacing of the abrasive particles from their original oriented position.

11. The process of making abrasive coated flexible webs having elongated abrasive particles oriented in an upstanding position, which comprises applying a base coat of wet adhesive to a flexible web, applying to said base coat a layer of abrasive grain having a considerable proportion of its elongated particles oriented in an upstanding position with relation to the web, drying the base coat so as to hold the particles so oriented during the subsequent spraying operation, positioning the thus dried abrasive coated web in a substantially horizontal position with the abrasive coated side uppermost, atomizing a liquid adhesive and projecting the atomized particles downwardly in an atmosphere containing a solvent for the adhesive against such abrasive coated surface with sufficient force to deposit the droplets of adhesive between and around the bases of the upwardly projecting abrasive particles, the solvent laden atmosphere serving to maintain the adhesive in a liquid condition and the force of gravity tending to draw the liquid adhesive downwardly into the spaces between the abrasive particles leaving the upper projecting ends of the abrasive particles substantially free of adhesive, and drying the sizing coat without substantial disturbance of the oriented condition of the abrasive particles.

12. In the manufacture of a coated abrasive article including a carrier having abrasive particles and an adhesive bond which consists in increasing the strength of the bond and the area of contact between the abrasive particles and the bond by applying the adhesive to the abrasive particles on the carrier while subjecting the adhesive to an atmosphere effective to materially reduce air inclusions caused by the formation of air pockets.

13. In the process of forming a bond between abrasive grains and an adhesive on a carrier, the improved method which consists in surrounding the exposed area of the abrasive grains with a vapor medium which is condensible to a liquid miscible with the adhesive, and bringing about contact between the abrasive grains and the adhesive with the carrier in said vapor medium.

14. In the manufacture of abrasive articles of the character including a carrier, surface abrasive particles thereon and an adhesive bond for said particles, the improved method of increasing the strength of the bond and the area of contact between the particles and the adhesive which consists in applying the adhesive to the abrasive particles on the carrier while subjecting the adhesive to an atmosphere of a vapor solvent therefore effective to materially reduce air inclusions caused by the formation of air pockets.

15. In the manufacture of abrasive articles of the character including a carrier, surface abrasive particles thereon and an adhesive bond for said particles, the improved method of increasing the strength of the bond and the area of contact between the particles and the adhesive which consists in applying the adhesive to the abrasive particles on the carrier while subjecting the adhesive to an atmosphere charged with steam.

16. In the manufacture of abrasive articles, the improved method which consists in depositing in oriented positions abrasive particles on a carrier having an adhesive coat and applying a sizing adhesive to the abrasive particles on the carrier in an atmosphere charged with a solvent for the adhesive in an amount sufficient to insure thorough penetration of the adhesive between the abrasive particles and the joining thereof with the previously applied adhesive coat.

*17. A coated abrasive article comprising a backing sheet, an adhesive base coating on said sheet, abrasive particles oriented with respect to the surface of said base coating and held in said oriented position to said surface by said base coating in set condition, and an adhesive size coating similar in composition to said adhesive base coating, the greater part of said size coating being deposited against said base coating and extending upwardly along the sides of the anchored ends of said abrasive particles to additionally support and maintain said abrasive particles in their originally oriented position.*

*18. A coated abrasive article comprising a backing sheet, an adhesive base coating of animal glue on said sheet, abrasive particles oriented with respect to the surface of said base coating and held in said oriented position to said surface by said base coating in set condition, and an adhesive size coating of animal glue over said base*

*coating, said size coating being deposited against said base coating and extending upwardly along the sides of the anchored ends of said abrasive particles to additionally support and maintain said abrasive particles in their originally oriented position.*

ROMIE L. MELTON.
RAYMOND C. BENNER.
HENRY P. KIRCHNER.

REFERENCES CITED

The following references are of record in the file of this patent or the original patent:

UNITED STATES PATENTS

| Number | Name | Date |
|---|---|---|
| Re. 17,494 | Power | Nov. 19, 1929 |
| 157,068 | Edwards | Nov. 24, 1874 |
| 684,568 | Gardner | Oct. 15, 1901 |
| 1,788,600 | Smyser | Jan. 13, 1931 |
| 1,854,071 | Schacht | Apr. 12, 1932 |
| 1,857,340 | Wyatt | May 10, 1932 |

FOREIGN PATENTS

| Number | Country | Date |
|---|---|---|
| 330,322 | Great Britain | June 12, 1930 |
| 385,788 | Great Britain | Jan. 5, 1933 |